United States Patent Office 3,556,581
Patented Jan. 19, 1971

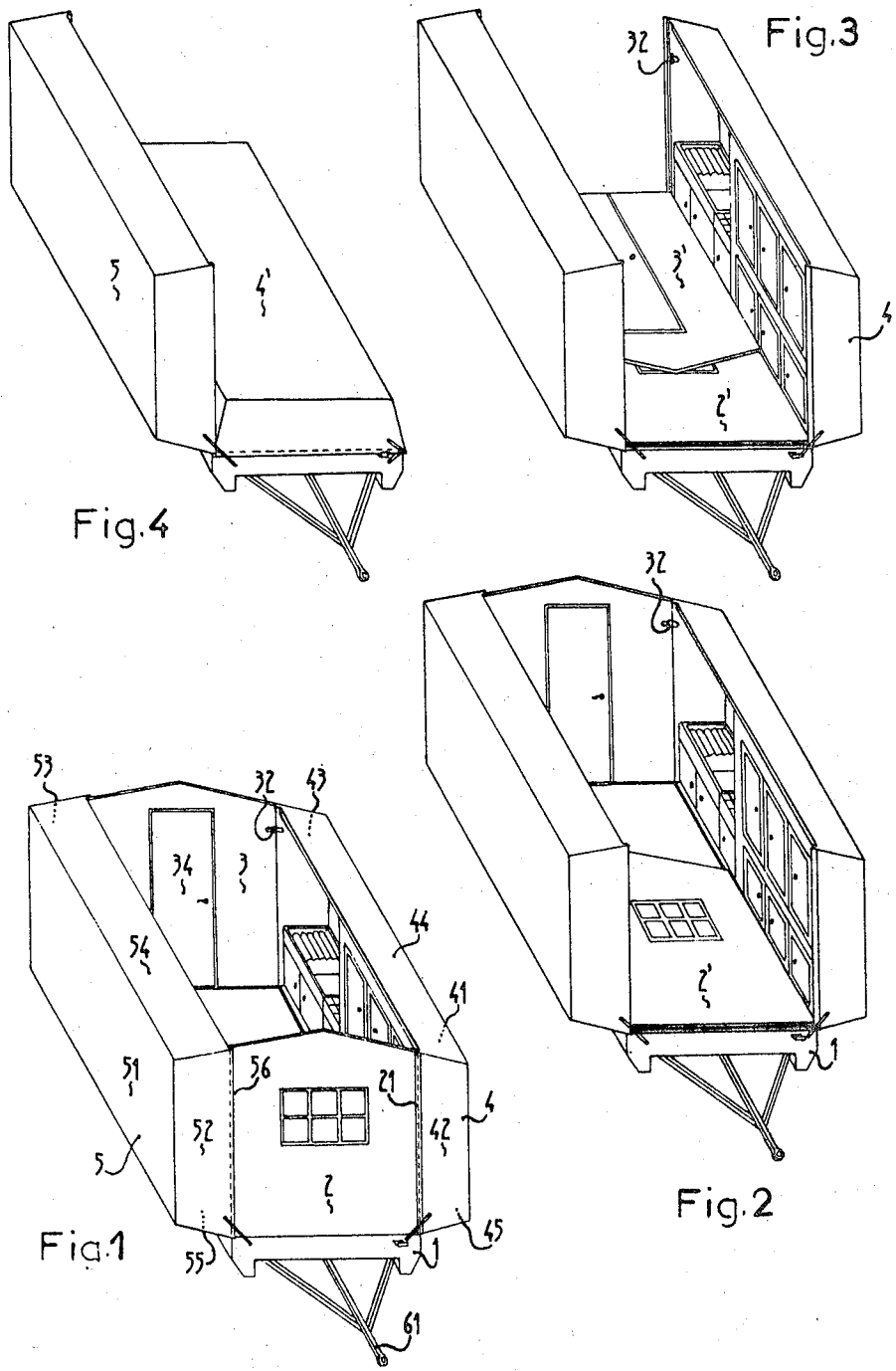

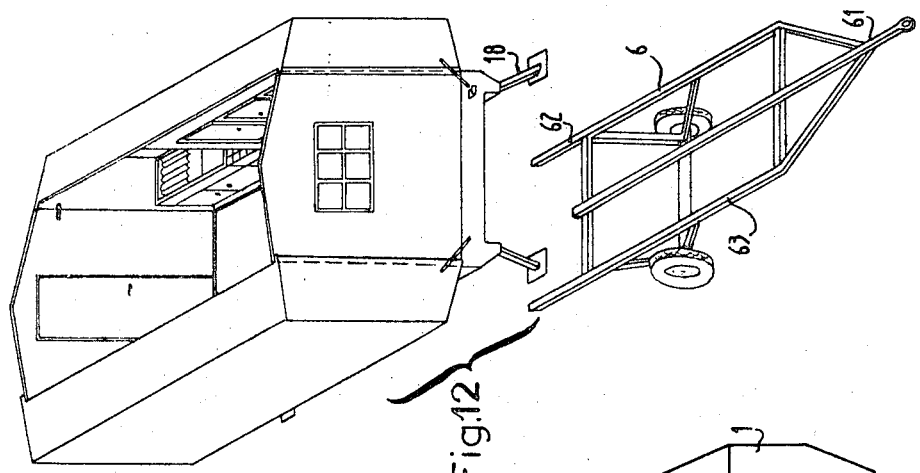
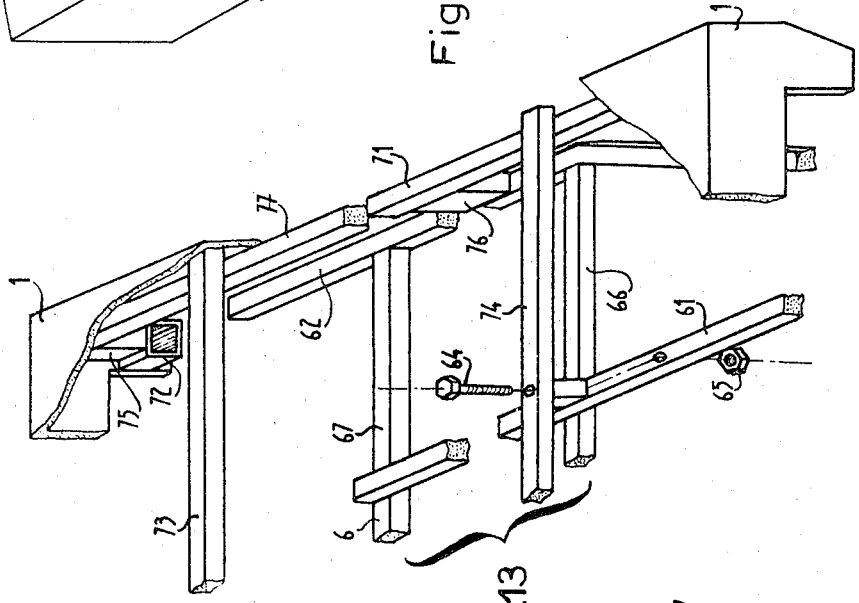
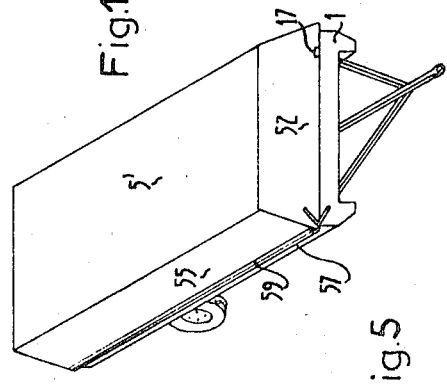

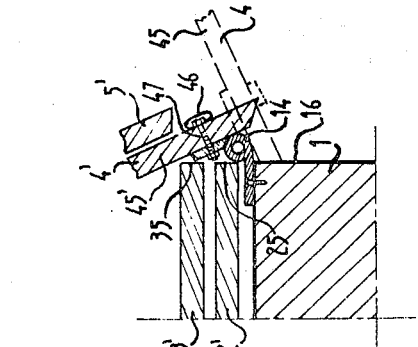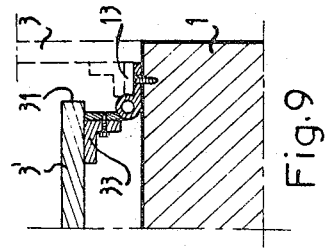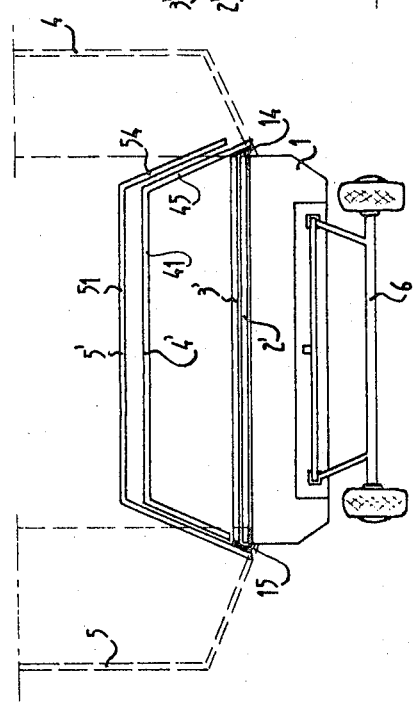

3,556,581
FOLDING CAMPING TRAILER
Americo G. Da Silva, Saulon-la-Chapelle, France,
assignor to Robert Devanne
Filed Jan. 22, 1969, Ser. No. 792,937
Claims priority, application France, Jan. 25, 1968, 880
Int. Cl. B60p 3/34
U.S. Cl. 296—23                                          10 Claims

ABSTRACT OF THE DISCLOSURE

A folding camping trailer comprising a platform-chassis detachably mounted on a running gear and hinged to the four sides of the platform-chassis, a foldable front panel, a foldable back panel, and two shell-type lateral panels, one being slightly larger than the other to fold over it, the structure, after unfolding, forming four full side walls, an enlarged floor surface and portions of the roof of a camping shelter.

BACKGROUND OF THE INVENTION

Field of the invention

The invention relates to camping trailers of the type known as "caravans" and more particularly to folding trailers of this kind.

Description of the prior art

Many types of camping trailers are already known which can be folded-up for road travel, more particularly trailers wherein two hoods, pivotably connected one to the front end and the other to the rear end of a platform, are folded on one another when the trailer is folded-up; when the trailer is unfolded, these hoods are raised, each about its pivotable connection; the base of each of these hoods, lifted into a vertical position, constitutes the front or rear wall of the living space; the sides of the hoods form initial lateral wall parts for the living space, which are supplemented by folding panels put in position at the time of assembly. A roof completes the general assembly.

This type of two-hood trailer makes it possible to increase the length of the living space relatively to the dimensions of its folded position.

Other types of trailer are also known in which the chassis carries folding side racks; on the front and rear edges of these racks there are mounted rectangular end panels and on the longitudinal edges of these racks there is mounted a panel at right angles with the first two and with the side rack; in the unfolded position, the side racks are swung into a horizontal position; thus the living space gains in width, which is generally preferable to a gain in length. To complete the assembly of the trailer in the unfolded position, panels have to be put into place to constitute the front and rear walls and in order to extend the lateral walls upwards.

SUMMARY OF THE INVENTION

The invention has as its object to provide a folding trailer which, whilst having the minimum of bulk in the folded position, makes it possible to obtain, by an unfolding operation using only pivotable connections, four walls, a floor surface larger than in the folded position, and a part of the roof.

A trailer according to the invention is constituted by a platform-chassis mounted on running gear in the road position, by two panels which are of the same width as the platform-chassis, namely a first panel pivotably connected to one side of the platform-chassis and a second panel mounted on an angle member pivotably connected to the opposite side of the platform-chassis, by two shell-shaped sections of slightly different dimensions which are each pivotably connected to one of the two other sides of the platform-chassis; each shell comprises a base, two parallel faces perpendicular to the base, and two oblique longitudinal faces forming the same angle with the base, and it is pivotably connected to the platform-chassis by the edge of one of its oblique faces.

When the trailer is unfolded, the base of each shell constitutes an entire side wall of the trailer. The two parallel faces constitute end wall elements which are supplemented by the said two panels, the oblique face of each shell which is pivotably connected to the platform-chassis constitutes an oblique prolongation thereof, and the opposite oblique face constitutes an element of the roof.

When the trailer is folded, there is the following sequence in the upward direction: the platform-chassis, the first panel, the second panel, the first shell, the second shell.

It is convenient to line the first shell with fitted furniture which is given a depth corresponding to the folded height of the shell.

Preferably, moreover, the said platform-chassis is provided with props or legs which are folded or dismounted during road travel, and which can be brought into use at a camping site, and the running gear of the trailer is detachable, which permits using it to transport equipment when the trailer itself is in use on a camping site without its running gear.

In the road position, that is to say in the folded position, the trailer is sufficiently low to permit placing a boat of convenient size on the second shell without prejudicing road stability. Therefore, it is possible to arrive at the camping site with trailer and boat, remove the boat, mount the trailer, withdraw its running gear, mount the boat on the running gear, and tow it to the nearest water.

BRIEF DESCRIPTION OF THE DRAWINGS

FIG. 1 shows in perspective view, seen from above, a trailer according to the invention unfolded but without its roof;

FIGS. 2, 3, 4 show three stages in the folding of this trailer;

FIG. 5 shows the same in the folded position;

FIG. 6 is a transverse view to explain the arrangement of the shells and their folding;

FIG. 7 is a longitudinal view to explain the arrangement of the panels and the folding thereof;

FIGS. 8 and 9 show in section, and on a larger scale, details of the pivotable connection of the two panels;

FIG. 10 shows in section and on a larger scale details of the pivotable connection of the small shell;

FIG. 11 shows in section, and on a larger scale details of the pivotable connection of the large shell;

FIG. 12 shows a trailer on its props, and its running gear removed, and

FIG. 13 shows details of the assembly of the running gear to the trailer.

DESCRIPTION OF THE PREFERRED EMBODIMENT

Reference will be made first of all to FIG. 1 which shows a trailer according to the invention in the unfolded position with the roof left open. This trailer is constituted by a platform-chassis 1 mounted on a running gear of which only the draw bar 61 is shown, a front wall which is a flat panel 2, a rear wall which is a flat panel 3, a small shell 4 and a large shell 5. These shells 4 and 5 have homothetical, i.e. similar, shapes to allow one to envelop the other in the folded position, meaning that they have almost, but not strictly, identical dimensions. In FIG. 1, as also in the following figures, the difference in size has been deliberately exaggerated; in actual fact it would need a practiced eye to notice any difference; however, it is convenient to talk of a large shell and a small shell.

The shell 5 comprises a base 51 which constitutes a wall of the trailer, two vertical parallel plane faces 52 and 53, an oblique face 54 which constitutes a roof element, and an oblique face 55 which extends the floor of the platform-chassis 1 obliquely.

In the same way, the shell 4 comprises a base 41, two parallel faces 42 and 43, and two oblique faces 44 and 45.

The length of the base 51 of the shell 5 is slightly greater than that of the base 41 of the shell 4, which means that the faces 42 and 52 on the one hand, and 43 and 53 on the other hand are not exactly aligned with one another. In the unfolded position a panel 2 is in the same plane as the face 42 of the shell 4, and this is why the sealing of the joint between the panel and the face is effected by a covering bead 21 on the face 42. But at the other side of the panel 2 the rim 56 of the face 52 of the shell 5 covers the edge of this panel. The same applies as regards the panel 3; at 32 there can be seen one of the fasteners which is used for connecting the panels and the shells.

To carry out the folding of the trailer, first of all the two fasteners (not shown in the drawings) which assemble the panel 2 to the faces 42 and 52 of the shells 4 and 5 are released, then this panel is folded at 2' onto the platform-chassis 1 (FIG. 2). Then the fasteners such as 32 on the panel 3 are undone, and this panel is folded to 3' (FIG. 3).

Then the shell 4 is folded to 4' (FIG. 4), and the shell 5 to 5' over the shell 4' (FIG. 5). At this time the sequence is, in the upward sense (FIG. 6), the running gear 6, the platform-chassis 1, the panel 2', the panel 3', the shell 4' and the shell 5'.

A more detailed explanation will now be given of the four operations of folding, and first of all the folding of the panel 2 with regard to FIGS. 7 and 8; this latter figure, on a larger scale, shows how the lower edge of the panel 2 is mounted by a hinge 12 on the front edge of the platform 1; folding makes it move from position 2 to position 2'.

FIG. 9 shows that towards the lower edge 31 of the panel 3, and on the inner face of this panel, there is mounted an angle member 33 and that this angle member is itself fixed to a hinge 13 in the vicinity of the rear edge of the platform-chassis 1; the folding of the panel moving it from position 3 to position 3'.

If the panel 3 is provided with a door 34 (FIG. 1), it is preferable that the angle member 33 and the hinge 13 are interrupted over the width of this door.

The shell 4 (FIG. 10) is pivotably connected by a hinge 14 one of whose leaves is fixed to the vicinity of the lower edge of the face 45 of this shell by means of bolts 47 the head of each of which is accommodated in a strip 46 extending from end to end of this face 45; the other leaf of the hinge is screwed to one side of the platform-chassis 1. In the open position 4, the lower edge of the face 45 comes to abut on the side 16 of the platform-chassis 1. FIG. 10 shows that the sides 25 and 35 of the panels 2 and 3 (shown folded at 2' and 3') are vertically above the side 16; naturally, they are still in this same vertical plane when the panels are upright; the faces 42 and 43 (FIG. 1) are in the same plane as the panels 2 and 3 upright, which explains the fact that they are in prolongation of these panels when the trailer is unfolded and explains the need for covering beads such as 21.

As for the oblique face 44 of the shell 4 (FIG. 11) it is slightly less wide than the oblique face 45, owing to the presence at 2' and 3' of the panels 2 and 3 whose edges 26 and 36 are vertically above the side 116 of the platform-chassis 1.

The shell 5 is pivotably connected by a hinge 15 one of whose leaves is fixed in the vicinity of the lower edge of the face 55 of this shell by means of bolts 58 whose heads are accommodated in a strip 59 (shown also in FIG. 5) extending from end to end of this face 55; the other leaf of the hinge 15 is screwed to one side of the platform-chassis 1.

In order that the shell 5 can cover the shell 4 in the folded position, it is necessary that the face 52 (FIG. 1) should not be in the same plane as the face 42, and also that the face 53 should not be in the same plane as the face 43. It is recalled that in the unfolded position the face 42 and the panel 2 are in one and the same plane. This is why, when it is lifted, the panel 2 comes to abut on the edge 56 of the face 52; in the folded position, this edge 56 comes lower down than the edge 57 of the face 55; the projection of the face 52 has been voluntarily exaggerated in FIG. 5. In this same figure, 17 designates a stud on which the shell 5 rests so as to prevent it from distorting the shell 4 by its weight.

The characteristic trapezoidal cross-sectional shape of the shells 4 and 5, as FIG. 6 shows most clearly, results not only from a desire to obtain an attractive appearance and an appearance of lightness for the trailer in the road position. The choice of this trapezoidal section also results from practical considerations: more particularly it permits the lifting of the large shell by rotating it about its hinge 15, which lifting would not be possible if the walls 45 and 54 were perpendicular to the bases 41 and 51 of the shells 4 and 5 respectively.

To be more precise, to make this lifting possible it is necessary that the plane passing through the upper edge of the wall 54 and perpendicular to this wall should pass below the hinge 15 or, at the most through the hinge 15, which is the case in FIG. 6; preferably, in a railer according to the invention a position will be chosen in the vicinity of this critical point.

Naturally, with the trailer unfolded, whether it is standing on its wheels (FIG. 1) or whether it is resting on its props (FIG. 12), it has to be completed by some kind of roof, for example a tent cloth.

FIG 12 shows the trailer unfolded (still with an open roof) resting on legs or props such as 18. Once on the ground and unfolded, the trailer is tilted forwards (draw bar 61 on the ground), the two rear props are positioned, the trailer is righted again, the front is lifted with a jack, the running gear is uncoupled and withdrawn, the front props are put in position and the front of the trailer is lowered on to these props by means of the jack. The running gear can then be used for another purpose.

A coupling device between the body of the trailer and the running gear will now be described in relation with FIG. 13. This particularly simple device is, however, robust; it lends itself easily to rapid coupling and uncoupling.

This figure shows a view from above in which the platform of the trailer appears in a fragmentary manner; it will be seen that the frame 71 of the platform-chassis 1 comprises two longitudinal support beams one of which is visible at 77, and two cross-bars 73 and 74. Welded on each longitudinal beam are blocks such as 75 and 76 for the longitudinal beam 77, and below each rear block 75 there is welded a hollow tubular element 72 whose inner size corresponds, apart from tolerances, to the external size of the longitudinal beams of the running gear.

The running gear 6 itself comprises a frame constituted by two longitudinal members one of which is shown at 62, two cross-members 66 and 67, and a draw bar 61; the running gear 6 naturally also comprises wheels, which are not shown in this figure so as not to overload it.

In the road position, the ends of the longitudinal beams of the running gear are inserted in the hollow tubular elements such as 72, and a bolt 64 with nuts 65, or any other fixing means, hold the running gear 6 and the platform-chassis 1 integral with one another.

I claim:
1. A folding camping trailer comprising in combination:
   a running gear unit;
   a platform-chassis of rectangular outline mounted on top of said running gear;
   a flat front panel, and a similar rear panel, the width of said panels being substantially equal to the width of said platform-chassis;
   hinging means for pivotably connecting each of said panels to one of the two narrow sides of said rectangular platform-chassis, so that the panels can be pivoted from a horizontal folded position to a vertical open position;
   two substantially homothetical shells arranged at the two longitudinal sides of the rectangular platform-chassis; and
   hinging means for pivotably connecting each of said shells to a longitudinal edge of the platform, so that the shells can be pivoted from a horizontal folded position to a vertical open position, said shells, together with said front and rear panels, thus forming in their open vertical position four complete walls and a portion of a roof of a camping shelter.

2. A trailer according to claim 1 wherein the hinging means for the front and rear panels includes an angle member on one of the panels to permit its folding over the other panel into an overlapping parallel horizontal position.

3. A trailer according to claim 1 wherein each shell comprises a plane rectangular base and four upstanding plane faces, said four faces thus forming shorter front and rear faces and longer longitudinal bottom and top faces, said shell hinging means being attached to the free edges of said longitudinal bottom faces.

4. A trailer according to claim 3 wherein the front and rear plane faces have a trapezoidal outline and are perpendicular to the shell base so that the two longitudinal plane faces form an obtuse angle with the base to give said shells an approximately trapezoidal cross-sectional outline, with the longest side of the trapezoid corresponding approximately to the width of said rectangular platform, one of said homothetical shells being larger than the other to freely fit over the outside thereof, when the smaller and the larger shell are successively pivoted onto said platform around their attached edges.

5. A trailer according to claim 1 wherein one of the homothetical shells is fitted with furniture.

6. A trailer according to claim 1 wherein the running gear unit is detachable.

7. A trailer according to claim 6 wherein the platform-chassis is provided with two hollow tubular elements and wherein the detachable running gear is provided with a frame constituted by two longitudinal elongated elements, to be accommodated in said hollow tubular elements, two cross members and a draw bar.

8. A trailer according to claim 1 wherein said shell hinging means include abutment means to arrest the opening motion of the shells, after they have been pivoted into the vertical position.

9. A trailer according to claim 8 wherein said shell hinging means, in the open position, support the weight of said shells.

10. A trailer according to claim 4 wherein the front and rear plane faces of at least one shell include a covering bead along their free edge to allow sealing engagement of the opened front and rear panels with both shells, after the latter have been pivoted into open position.

FOREIGN PATENTS 1,003,035    11/1951    France _____ 296—23.6
866,281      4/1961     Great Britain _____ 296—23.6

PHILIP GOODMAN, Primary Examiner

U.S. Cl. X.R.

296—27